(12) United States Patent
Bhattacharjya

(10) Patent No.: US 7,330,586 B2
(45) Date of Patent: Feb. 12, 2008

(54) LOW-LIGHT EXPOSURE MODES FOR DIGITAL PHOTO SENSORS WITH FREE-RUNNING SHUTTERS

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 648 days.

(21) Appl. No.: 10/963,358

(22) Filed: Oct. 12, 2004

(65) Prior Publication Data

US 2006/0078310 A1   Apr. 13, 2006

(51) Int. Cl.
*G06K 9/00* (2006.01)
(52) U.S. Cl. .................. 382/162; 382/164; 382/286
(58) Field of Classification Search ............... 382/162, 382/164, 165, 260, 286, 291
See application file for complete search history.

(56) References Cited

U.S. PATENT DOCUMENTS

| | | | |
|---|---|---|---|
| 4,614,966 A | 9/1986 | Yunoki et al. | |
| 6,429,415 B1 | 8/2002 | Rhoads | |
| 6,628,330 B1 * | 9/2003 | Lin | 348/252 |
| 6,879,731 B2 * | 4/2005 | Kang et al. | 382/274 |
| 2003/0098919 A1 | 5/2003 | Liu et al. | |
| 2003/0117518 A1 | 6/2003 | Pyle | |
| 2003/0210344 A1 | 11/2003 | Bloom | |

* cited by examiner

*Primary Examiner*—Phuoc Tran

(57) ABSTRACT

Techniques for locating one or more regions of interest in a frame sequence by tracking activity at pixel locations in the sequence enables subsequent manipulation of color pixel values to achieve various interesting effects, such as time-scale filtering, color-based filtering and user selected motion control. The data structure for storing color information at each pixel location is one or more hyperspheres. The color signal of each pixel in the frame sequence at a given location is examined and new hyperspheres are created or existing ones updated as the pixel signals are examined. At the end of the process, each sphere associated with the given pixel location stores a final center color value, the number of pixels, and a radius value that is proportional to the signal variance of the pixels in that sphere. Based on the data collected, select pixel values in one or more select frames can be modified to achieve the desired effect(s).

22 Claims, 3 Drawing Sheets

LOW-LIGHT EXPOSURE MODES FOR DIGITAL PHOTO SENSORS WITH FREE-RUNNING SHUTTERS

BACKGROUND OF THE INVENTION

1. Field of the Invention

The present invention relates to techniques for cameras that enable the generation of a series of images that may be composed into a still image frame sequence or short video clip. The techniques of the invention involve the processing of those images, often under low-light conditions, to achieve various interesting effects. The techniques are designed to be incorporated into hand-held devices, such as cell phones, etc, that have such a camera.

2. Description of the Related Art

The popularity of low-cost cell phones that also support image capture functions is on the rise. These devices typically also support a high level of user interaction through button- and/or pen-based user input. The presence of such interactive user-controls coupled with immediate feedback on the cell phone display enables a new class of image acquisition, manipulation and creation modes that were previously unavailable in analog or consumer-level digital imaging devices.

A typical low-cost image acquisition element, such as the photo sensor in a cell phone, operating with a free-running shutter can generate a sequence of images that may be acquired for composing still image frames or short video clips. As the popularity of the cell-phone-camera function increases, manufacturers and designers are looking to add more features to give the user even more options regarding the manner in which images are captured and viewed.

OBJECTS OF THE INVENTION

Accordingly, it is an object of the present invention to provide further functionality for cameras, particularly cameras in hand-held devices, in the technical area of image capture and manipulation.

It is a further object of this invention to provide techniques for generating still images from a short sequence of images, particularly a sequence acquired under low-light conditions. Such techniques include (i) low-light long exposure with user-selectable light tracking, (ii) dynamic range optimization based on frame statistics, (iii) time-scale filtering, and/or (iv) color-based filtering.

SUMMARY OF THE INVENTION

According to one aspect, this invention provides a method for locating one or more regions of interest in a frame sequence defined by a plurality of pixel locations, each of which includes a corresponding pixel from each frame in the sequence, based on color information at each pixel location that is stored in a data structure having as a mathematical construct a collection of spheres, each of which includes a center value. The method comprises: (a) initializing the center value of a first sphere associated with a given pixel location to a color value of the corresponding pixel in a first frame; and (b) examining a color value of the pixel in each subsequent frame corresponding to the given pixel location to determine which, if any, of the first sphere or any other sphere created the value of that pixel lies. Step (b) is performed such that (b)(1) if a currently examined pixel lies within only one of the spheres, the center value of that sphere is updated to take into account the color value of the currently examined pixel, (b)(2) if the currently examined pixel lies within multiple spheres, the center values of such spheres are updated, taking into account respective weighted portions of the color value of the currently examined pixel, and (b)(3) if the currently examined pixel does not lie within any sphere currently in existence, a new sphere is created with its center value being set as the color value of the currently examined pixel. After all pixels at the given pixel location are examined, each sphere associated with the given pixel location stores color information obtained from pixels at the given pixel location.

Preferably, the color information stored by each sphere at the given pixel location includes a final center value for that sphere, the number of pixels in that sphere, and a radius value for that sphere, the radius value being proportional to a variance of the color information of the pixels in that sphere.

Preferably, steps (a) and (b) are repeated for each pixel location in the frame sequence.

Various filtering techniques may be performed in accordance with aspects of the invention. Time-scale filtering may be performed by removing spheres that do not contain a predefined minimum number of pixels. Color-based filtering may be performed by removing spheres that do not satisfy a predefined color constraint.

Motion control may be performed on a selected object in the frame sequence based on the color information contained in the one or more spheres at each pixel location of the selected object. The motion control may be performed on the selected object so as to render it stationary in the frame sequence.

In another aspect, the invention involves a device (e.g., a hand-held device such as a cell phone, etc.) with photo sensors that operate with a free-running shutter. The device includes an image capture element configured to capture a sequence of image-containing frames defined by a plurality of pixel locations, each of which includes a corresponding pixel from each frame in the sequence, and a memory having a data structure that has as a mathematical construct a collection of spheres, each having a center value, for storing color information at pixel locations. The device further includes a processor configured to perform the various processing functions described above.

In accordance with further aspects of the invention, the above-described method or any step thereof may be performed in response to execution of a program of instructions (e.g., software) by a computer or other processor-controlled device. Alternatively, the program of instructions may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

In the following description, the image/photo sensor is assumed to be a planar, rectangular-shaped tiling of pixels that may be square- or non-square-shaped. Each pixel may provide information about one or more color channels. In the preferred embodiments invention, each pixel is processed independently, so as to enable the handling of mosaiced or de-mosaiced image data with equal facility.

The sensor is calibrated by acquiring a sequence of frames under conditions of darkness, e.g., by collecting image frames after covering the lens aperture, or by taking images inside a black box. The mean and the variance of the signal obtained at each pixel location are stored for future use. This characterization is used for ameliorating the effect of dark current noise on image quality.

Assuming that each frame is composed of a set of pixels indexed by $i \in \{0, \ldots, I-1\}$, the final image frame sequence is composed by processing a sequence of N image frames denoted $F^n$, $n \in \{0, \ldots, N-1\}$. Each pixel in a frame encodes one or more color signal values denoted $F_i^n$. The same color channel need not be present at all pixel locations (as for example in the output of a mosaiced sensor). The color signals for all of the pixels at a given location indexed by i are accumulated across all frames and stored as the sum $A_i$ given by $$A_i = \sum_{n=0}^{N-1} F_i^n.$$

All of the $A_i$'s form an accumulator array denoted A.

Figure 1:
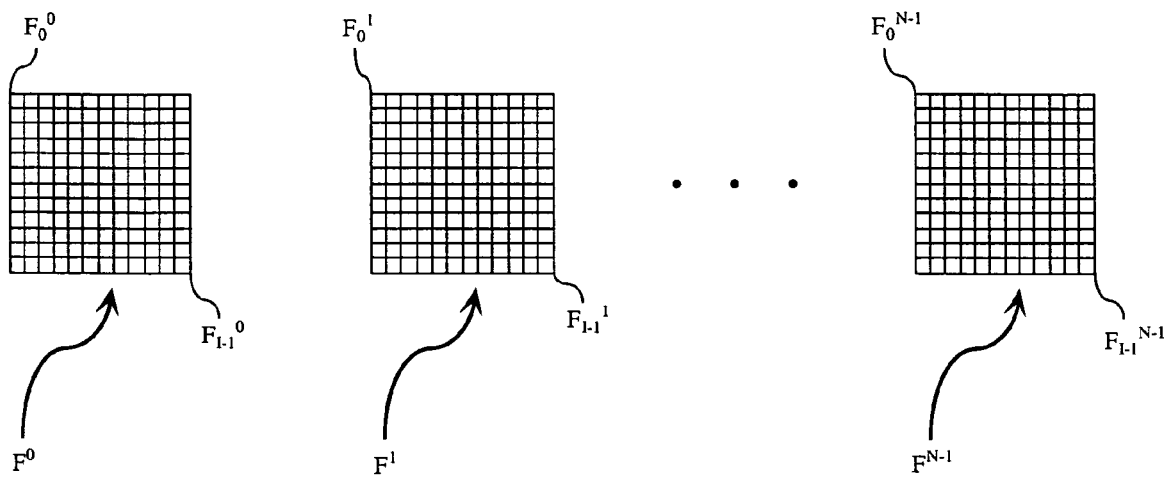
FIG. 1 is a schematic diagram illustrating a sequence of image frames, pixel locations in the frames, and the symbols used to denote the color signals received from the pixels.

FIG. 1 schematically illustrates a sequence of image frames $F^0, F^1, \ldots, F^{N-1}$ to be processed in accordance with the invention. Assuming a raster ordering of the pixels, the locations of which are depicted as squares in FIG. 1, the pixel in the upper left corner of each image frame is indexed by i=0 and the pixel in the lower right corner of each image frame is indexed by i=I−1. Thus, the color signal value(s) from the pixels in the upper left location in the frame sequence are designated $F_0^0, F_0^1, \ldots, F_0^{N-1}$ respectively, and the color signal value(s) from the pixels in the lower right in the sequence are designed $F_{I-1}^0, F_{I-1}^1, \ldots, F_{I-1}^{N-1}$ respectively, as shown in FIG. 1.

Typically, long-exposure, low-light images contain a number of possibly moving light sources (e.g., stars, car lights, etc.), and the process of computing a simple mean based on the accumulated counts in the above summation would lead to the suboptimal result of washing out moving lights. With such processing, only stationary lights would be strongly visible. Thus, a nonlinear scaling of the accumulated counts is typically required to highlight moving/dynamic light sources in captured frames.

In accordance with embodiments of the invention, histogram peak tracking on a per pixel basis is employed to determine interesting activity at each pixel location. Color information at each pixel location is tracked. The data structure for storing such information is a hypersphere with a radius proportional to the signal variance of the pixels in that hypersphere. A hypersphere is an n-sphere generalization of a circle n=2 and sphere n=3 and is defined as the set of n-tuples of points $(x_1, x_2, \ldots, x_n)$ such that $$x_1^2 + x_2^2 + \ldots + x_n^2 = R^2,$$

where R is the radius of the hypersphere. Each pixel location may have one or more hyperspheres associated with it. A "hypersphere" is referred to below simply as a "sphere."

Figure 2:
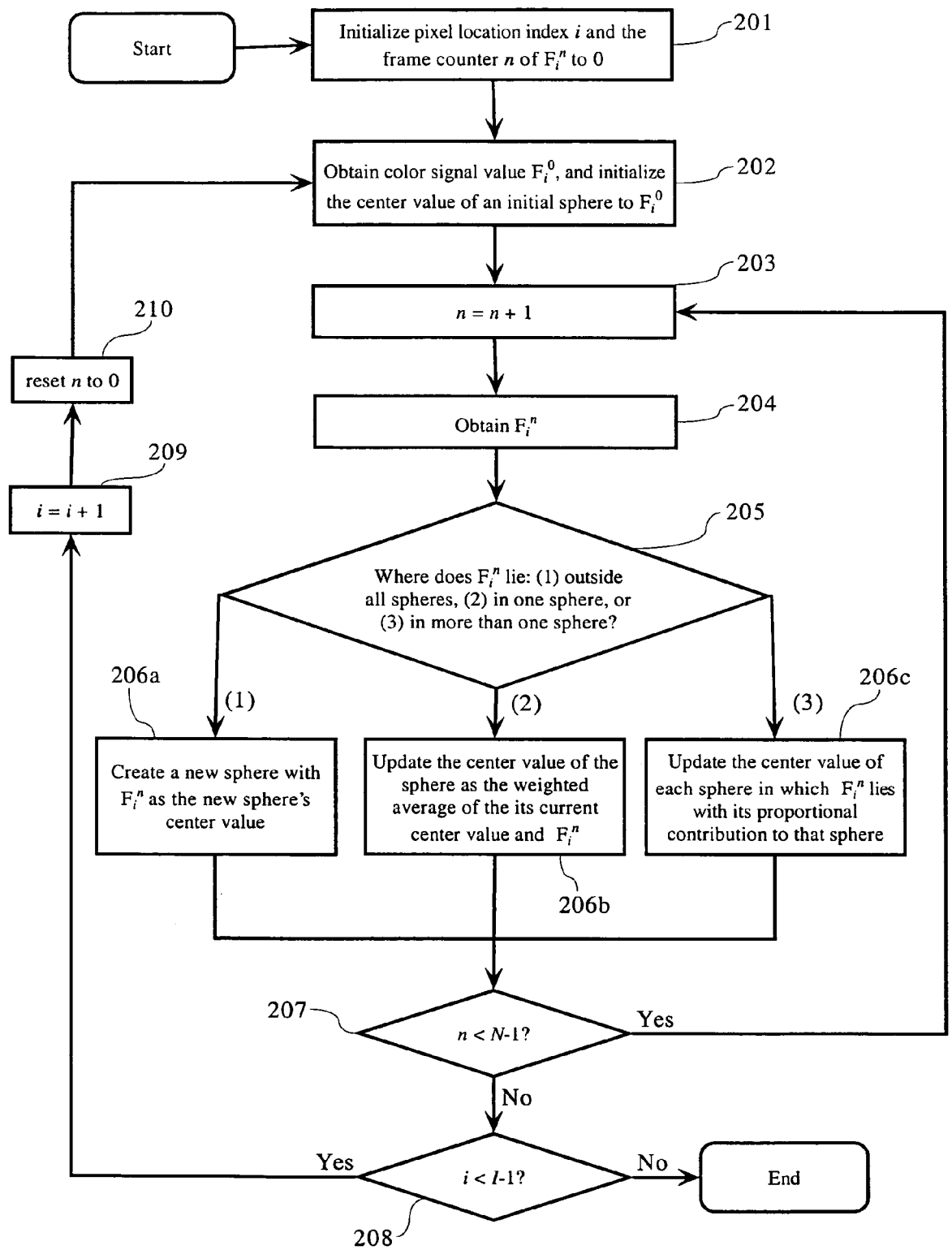
FIG. 2 is a flow chart illustrating processing operations of the techniques according to embodiments of the invention.

With reference to the flow chart of FIG. 2, the forming of one or more information-containing spheres at each pixel location is described. In step 201, both the pixel location index i and the frame index n are initialized to zero. In step 202, the center of an initial sphere is initialized to the color value of the pixel at the present location (initially, at the location i=0) in the first frame (n=0). That is, initially a first sphere is created that has as its center value $F_i^0$. Frame counter n is incremented in step 203, and the color signal from the pixel at the present location in the next frame is obtained in step 204. It is then determined in step 205, as it will be determined for each subsequent pixel at the present location obtained from successive frames, whether the color value of the current pixel lies within the initial sphere (or any sphere currently in existence at that location). There are three possibilities. If that pixel value lies outside all spheres, a new sphere is created with the new pixel value as the new sphere's center value (step 206a). If that pixel value lies within one sphere, the center value of that sphere is updated as the weighted average of its current center value and the value of the new pixel (step 206b). If the current pixel value is within multiple spheres, its contribution to each center value is weighted according to the distance from the associated center (step 206c).

In the case of a new pixel value being in multiple spheres (step 206c), the weighting allocation is as follows. Denote the set of spheres at pixel location i by $\{(c_k^i, R_k^i, N_k^i), k \in K\}$, where $c_k^i$ is the color value associated with the center of the $k^{th}$ sphere, $R_k^i$ is the radius of the $k^{th}$ sphere, $N_k^i$ is the number of pixels belonging to the $k^{th}$ sphere, and K is a set of indices indexing the spheres. Let a new pixel from a new frame have color value p that lies within a set of spheres $\{c_j^i, j \in J(\subset K)\}$, where J is a subset of K such that, $\|p - c_j^i\| < R_j^i$ for $j \in J$. One method of determining the weight of membership of p in each of the containing spheres is by setting it inversely proportional to sphere proximity given by $$\frac{\|p - c_j^i\|}{\sum_{n \in J} \|p - c_n^i\|}.$$

Denoting the membership of p in sphere $(c_j^i, R_j^i, N_j^i)$, $j \in J$, by $w_j^i$, it will be understood that $w_j^i \in [0,1]$, and $\sum_{j \in J} w_j^i = 1$. The individual sphere values are updated as $$c_j^i \leftarrow \frac{c_j^i N_j^i + w_j^i p}{N_j^i + w_j^i}, \text{ and } N_j^i \leftarrow N_j^i + w_j^i.$$

If p does not intersect any of the spheres in K, a new sphere $(p, R^i, 1)$ is added to the set of spheres. The radius $R^i$ is computed as a scaled version of the noise variance measured at pixel location i. The above update scheme for tracking the sphere mean may be replaced by $c_j^i \rightarrow \alpha c_j^i + (1-\alpha) w_j^i p$, with $\alpha \in [0,1]$ to implement a mean tracker with the ability to forget the past.

Figure 3:
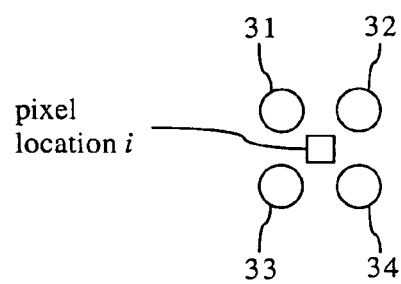
FIG. 3 is a schematic diagram illustrating a pixel location having associated with it multiple data-storing spheres.

Returning to FIG. 2, if there are still more frames to consider, as determined in step 207, the process loops back to step 203 where frame counter n is incremented. The color value associated with the current pixel location in the new frame is then obtained and processed in steps 204, 205 and 206. After all of the pixels at the present location i have been processed, that pixel location will have associated with it one or more spheres, each of which has three pieces of information: a color value, a radius value, and the number of pixels in that sphere. FIG. 3 schematically shows an example of a pixel location i having four spheres 31, 32, 33 and 34 associated with it. The showing of four spheres is for illustrative purposes only. Each pixel location may have from one (all pixels in one sphere) to N spheres (one pixel per sphere).

After all pixels at the present location (one from each frame) have been processed, it is determined in step 208 whether all pixel locations have been considered. If not, the pixel location index i is incremented in step 209 and the frame counter n is reset to zero in step 210. The color value of the pixel at the new location in the first frame is obtained and processed as indicated in step 202. The color value of each pixel at the new location, from the second frame to the $N^{th}$ frame, is obtained and processed in the loop of steps 203 through 207.

The inner loop is then exited to determine if all of the pixel locations have been considered (step 208). The process continues until all pixel locations have been considered, at which time the process stops.

While the flow chart of FIG. 2 illustrates the processing of all pixels at one pixel location before moving on to another location, the invention is not so limited. Parallel processing of multiple pixel locations at one time could also be employed, since the processing of the pixels at one location is independent of the processing of pixels at another location. The pixels at a given location, however, should be processed in sequence.

Having collected information regarding the pixel locations, that information can then be used to achieve various interesting effects as described below.

The number of regions seen at a given pixel location is given by the number of histogram peak-tracking spheres at that location. If a particular intensity is seen only fleetingly, it may be eliminated by applying a minimum count criterion to each sphere. Thus, for example, if a long exposure shot of stars in the night sky is being taken, an event such as an aircraft flying across the field of view can be effectively eliminated.

To perform time-scale filtering, spheres $(c_k^i, R_k^i, N_k^i), k \in K$ that do not satisfy constraints of the form $N_k^i \geq N_{min}$ are removed. $N_{min}$ will vary depending on the time-scale desired.

Regarding color-based filtering, the colors of interest at a given pixel location may be specified according to preset criteria such as bright colors, or colors with a particular hue, etc. Thus, for example, if bright colors are of interest, only the brightest sphere for a given pixel location is retained. If color criteria are specified, only spheres that meet the criteria are retained. Thus, for example, a long exposure shot of a highway may be set up to capture only red taillights and ignore white headlights.

Sometimes the user is interested in capturing a long-exposure scene in which it is desirable that certain objects be stationary. These objects may or may not be stationary with respect to the camera while the image is being acquired. For example, the user might want a long exposure shot of a star field with a designated star at the center. However, it is nearly impossible to align the optical axis of the camera with the star with enough precision to obtain the desired effect. The present invention includes a technique that can overcome this problem. For such cases, the user is presented with an option of choosing one or two objects in a scene that will be rendered as stationary. Prior to combining multiple frames together, these objects are tracked between frames and registered with previous frames, so that such objects appear stationary in the combined rendering.

This technique also allows rendering of the scene with respect to a virtual camera moving with one of the moving objects in the image field.

In registering motion (displacement) between captured frames, first the user selects one or more bright sources that should be rendered as stationary. A bounding rectangle around the selected light is used as a template to search for the light object in the next frame. An integer-pixel search in a neighborhood of the current object position, followed by a sub-pixel gradient descent assuming translation, rotation and small-scale change, is performed to refine the location estimate of the object. The frames are registered using translation, rotation and uniform scaling using the locations of the referenced objects. If only one reference object is specified, rotation is assumed to be zero.

Sub-pixel template matching is performed as follows. Let $\mu$ denote the template (with square report) with pixel intensities scaled to the range [0,1]. Denote the new frame data (scaled to [0,1]) by the array $v$. Compute a vector force field given by $\mu \nabla v - v \nabla \mu$ at each pixel location (x, y) in the support of $\mu$. The effect of this force field acting on the template $\mu$ is used to update the position, location and scale parameters. In particular, let $f_{xy} = (\mu \nabla v - v \nabla \mu)(x, y)$. Let $r_{xy}$ denote the position vector of the pixel (x, y) from the centroid of $\mu$. Then, the position is updated by $\delta_1 \Sigma_{(x, y) \in sup\ port(\mu)} f_{xy}$, rotation is updated by $\delta_2 \Sigma_{(x, y) \in sup\ port(\mu)} r_{xy} \times f_{xy}$, where $\times$ denotes the vector cross product, and the scale is updated by $\delta_3 \Sigma_{(x, y) \in sup\ port(\mu)} r_{xy} \cdot f_{xy}$, where $\cdot$ denotes the vector dot product, $\delta_1$, $\delta_2$ and $\delta_3$ are small scalar constants.

The final image (frame sequence) is composed in any of a number of ways, depending on the objective. If highlighting bright moving objects is the main objective, the centers of the filtered histogram spheres are copied to the output image. If image detail is of interest, first the pixel locations that contain spheres within the first and last color deciles are identified. The means of accumulated sums corresponding to the identified pixels are used as lower and upper levels for rescaling the accumulated sum array. The rescaled values are copied to the output image.

Noise reduction can be achieved by subtracting a scaled version of the mean noise image (computed earlier from dark image frames) from the output image. Interpolation/de-mosaicing operations may be subsequently performed to obtain the final image.

Figure 4:
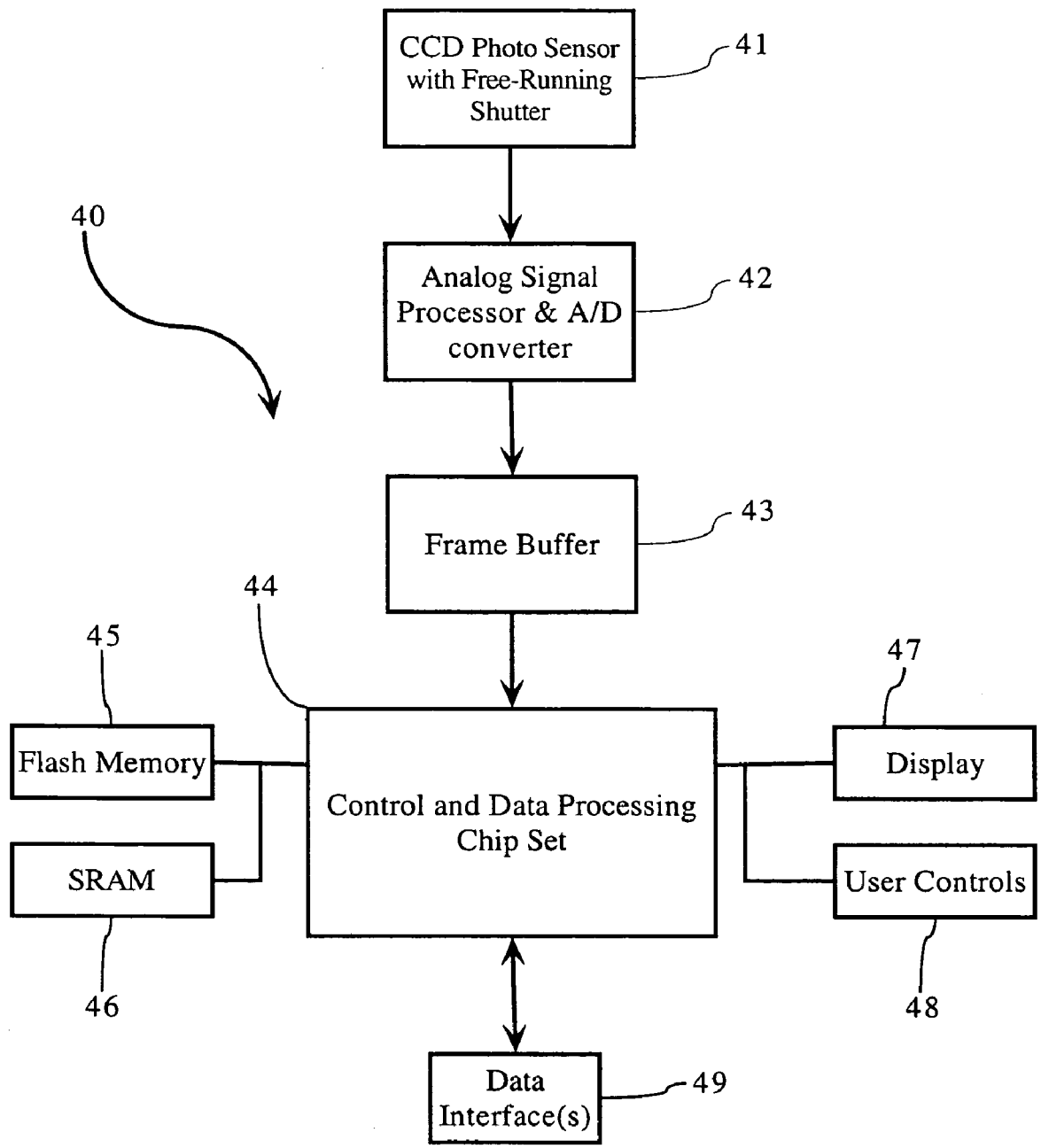
FIG. 4 is a block diagram of a system, which may be implemented in a hand-held device, for performing the various techniques of the invention.

Having described embodiments of the image frame sequence processing, the discussion now turns to a system for implementing the processing. As previously noted, the processing is deployed in a device that has the capability of generating a sequence of images. Preferably the processing is embodied in a hand-held device, such as a cell phone, in which the photo sensor operates with a free-running shutter. FIG. 4 is a block diagram of a system 40 for performing the functions described above is illustrated. System 40 can be embodied in a cell phone or other hand-held device.

Referring to FIG. 4, a charge-coupled device (CCD) sensor with free-running shutters 41 operating under microprocessor control captures a sequence of images in the form of light signals and converts the light signals to analog signals. An analog signal processor and analog-to-digital (A/D) converter 42 process the analog signals received from sensor 41 and then digitize the signals. The digital images are temporarily stored in a frame buffer 43 while they are being processed by a control and data processing chip set 44, which may include a mobile graphics engine (MGE).

The chip set 44 is in communication with memory, typically both non-volatile (e.g., flash) memory 45 and a form of random-access-memory (RAM), such as Static RAM (SRAM) or Dynamic RAM (DRAM) 46. Flash memory 45 may be used to store the hand-held device's operating system and applications, which may include embodiments of programs that implement various aspects of the present invention. During operation, code is fetched from flash memory 45 and executed. During execution, SRAM/DRAM 46 stores intermediate data, register stacks, etc.

In the illustrated embodiment, the techniques of this invention are carried out by chip set 44, which is configured to track and determine interesting activity at each pixel location in a frame sequence. Chip set 44 interacts with SRAM/DRAM 46, where the spherical data structure of collected frame statistics is maintained. Chip set 44 is further configured to perform the manipulations described above, i.e., time-scale filtering, color-based filtering and user-selected motion control.

System 40 also typically includes a display (e.g., a color LCD display) 47 and appropriate user controls 48 which will vary depending on the particular device in which the system is employed. A cell phone will typically have input controls in the form of a keypad.

System 40 also typically includes one or more interfaces 49 for communicating with external devices, that is, to send and receive information (i.e., programs and data) including data to be processed in accordance with this invention. To this end, data interface(s) 49 typically include components to connect to other devices directly or through any of a variety of networks including the Internet, a local or wide area network. The connection can be made by any known means and includes wired and wireless connections.

Within this environment or other environments suitable for carrying out the image frame processing described above, the processing of this invention may be conveniently specified in the form of software that controls the operation of the appropriately configured hardware. Alternatively, the processing instructions can be directly embodied in hardware, such as ASIC(s), digital signal processing circuitry, or the like to achieve the equivalent of such software-based instructions. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for locating one or more regions of interest in a frame sequence defined by a plurality of pixel locations, each of which includes a corresponding pixel from each frame in the sequence, based on color information at each pixel location that is stored in a data structure having as a mathematical construct a collection of spheres, each of which includes a center value, the method comprising:
    (a) initializing the center value of a first sphere associated with a given pixel location to a color value of the corresponding pixel in a first frame; and
    (b) examining a color value of the pixel in each subsequent frame corresponding to the given pixel location to determine which, if any, of the first sphere or any other sphere created the value of that pixel lies, such that
        (b)(1) if a currently examined pixel lies within only one of the spheres, the center value of that sphere is updated to take into account the color value of the currently examined pixel,
        (b)(2) if the currently examined pixel lies within multiple spheres, the center values of such spheres are updated, taking into account respective weighted portions of the color value of the currently examined pixel, and
        (b)(3) if the currently examined pixel does not lie within any sphere currently in existence, a new sphere is created with its center value being set as the color value of the currently examined pixel;
    wherein, after all pixels at the given pixel location are examined, each sphere associated with the given pixel location stores color information obtained from pixels at the given pixel location.

2. A method as recited in claim 1, wherein the color information stored by each sphere at the given pixel location includes a final center value for that sphere, the number of pixels in that sphere, and a radius value for that sphere, the radius value being proportional to a variance of the color information of the pixels in that sphere.

3. A method as recited in claim 1, wherein steps (a) and (b) are repeated for each pixel location in the frame sequence.

4. A method as recited in claim 3, further comprising performing time-scale filtering by removing spheres that do not contain a predefined minimum number of pixels.

5. A method as recited in claim 3, further comprising performing color-based filtering by removing spheres that do not satisfy a predefined color constraint.

6. A method as recited in claim 3, further comprising performing motion control on a selected object in the frame sequence based on the color information contained in the one or more spheres at each pixel location of the selected object.

7. A method as recited in claim 6, wherein the motion control is performed on the selected object to render it stationary in the frame sequence.

8. A device for locating one or more regions of interest in a frame sequence, the device comprising:
    an image capture element configured to capture a sequence of image-containing frames defined by a plurality of pixel locations, each of which includes a corresponding pixel from each frame in the sequence;

memory having a data structure that has as a mathematical construct a collection of spheres, each having a center value, for storing color information at pixel locations; and a processor, in communication with the memory, configured to initialize the center value of a first sphere associated with a given pixel location to a color value of the corresponding pixel in a first frame, and to examine a color value of the pixel in each subsequent frame corresponding to the given pixel location to determine which, if any, of the first sphere or any other sphere created the value of that pixel lies, such that, if a currently examined pixel lies within only one of the spheres, the center value of that sphere is updated to take into account the color value of the currently examined pixel, if the currently examined pixel lies within multiple spheres, the center values of such spheres are updated, taking into account respective weighted portions of the color value of the currently examined pixel, and if the currently examined pixel does not lie within any sphere currently in existence, a new sphere is created with its center value being set as the color value of the currently examined pixel;

wherein, after all pixels at the given pixel location are examined, each sphere associated with the given pixel location stores color information obtained from pixels at the given pixel location.

9. A device as recited in claim 8, wherein the color information stored by each sphere at the given pixel location includes a final center value for that sphere, the number of pixels in that sphere, and a radius value for that sphere, the radius value being proportional to a variance of the color information of the pixels in that sphere.

10. A device as recited in claim 9, wherein the processor is configured to perform the initialize and examine operations for each pixel location in the frame sequence.

11. A device as recited in claim 10, wherein the processor is configured to perform time-scale filtering by removing spheres that do not contain a predefined minimum number of pixels.

12. A device as recited in claim 10, wherein the processor is configured to perform color-based filtering by removing spheres that do not satisfy a predefined color constraint.

13. A device as recited in claim 10, wherein the processor is configured to perform motion control on a selected object in the frame sequence based on the color information contained in the one or more spheres at each pixel location of the selected object.

14. A device as recited in claim 13, wherein the motion control is performed on the selected object to render it stationary in the frame sequence.

15. A device as recited in claim 8, wherein the device is a hand-held device.

16. A device-readable medium carrying a program of instructions for directing a device to perform a method of locating one or more regions of interest in a frame sequence defined by a plurality of pixel locations, each of which includes a corresponding pixel from each frame in the sequence, based on color information at each pixel location that is stored in a data structure having as a mathematical construct a collection of spheres, each of which includes a center value, the program of instructions comprising:

(a) instructions for initializing the center value of a first sphere associated with a given pixel location to a color value of the corresponding pixel in a first frame; and (b) instructions for examining a color value of the pixel in each subsequent frame corresponding to the given pixel location to determine which, if any, of the first sphere or any other sphere created the value of that pixel lies, such that (b)(1) if a currently examined pixel lies within only one of the spheres, the center value of that sphere is updated to take into account the color value of the currently examined pixel, (b)(2) if the currently examined pixel lies within multiple spheres, the center values of such spheres are updated, taking into account respective weighted portions of the color value of the currently examined pixel, and (b)(3) if the currently examined pixel does not lie within any sphere currently in existence, a new sphere is created with its center value being set as the color value of the currently examined pixel;

wherein, after all pixels at the given pixel location are examined, each sphere associated with the given pixel location stores color information obtained from pixels at the given pixel location.

17. A device-readable medium as recited in claim 16, wherein the color information stored by each sphere at the given pixel location includes a final center value for that sphere, the number of pixels in that sphere, and a radius value for that sphere, the radius value being proportional to a variance of the color information of the pixels in that sphere.

18. A device-readable medium as recited in claim 16, wherein instructions (a) and (b) are executed for each pixel location in the frame sequence.

19. A device-readable medium as recited in claim 18, further comprising instructions for performing time-scale filtering by removing spheres that do not contain a predefined minimum number of pixels.

20. A device-readable medium as recited in claim 18, further comprising instructions for performing color-based filtering by removing spheres that do not satisfy a predefined color constraint.

21. A device-readable medium as recited in claim 18, further comprising instructions for motion control on a selected object in the frame sequence based on the color information contained in the one or more spheres at each pixel location of the selected object.

22. A device-readable medium as recited in claim 20, wherein the motion control is performed on the selected object to render it stationary in the frame sequence.

* * * * *

UNITED STATES PATENT AND TRADEMARK OFFICE
CERTIFICATE OF CORRECTION

| | |
|---|---|
| PATENT NO. | : 7,330,586 B2 |
| APPLICATION NO. | : 10/963358 |
| DATED | : February 12, 2008 |
| INVENTOR(S) | : Anoop K. Bhattacharjya |

It is certified that error appears in the above-identified patent and that said Letters Patent is hereby corrected as shown below:

Title Page

Item [56], References Cited, U.S. PATENT DOCUMENTS, please add

--2003/0095189 A1, 5/2003, Lie et al.--

Signed and Sealed this

Sixteenth Day of September, 2008

JON W. DUDAS
*Director of the United States Patent and Trademark Office*